Figure 12:
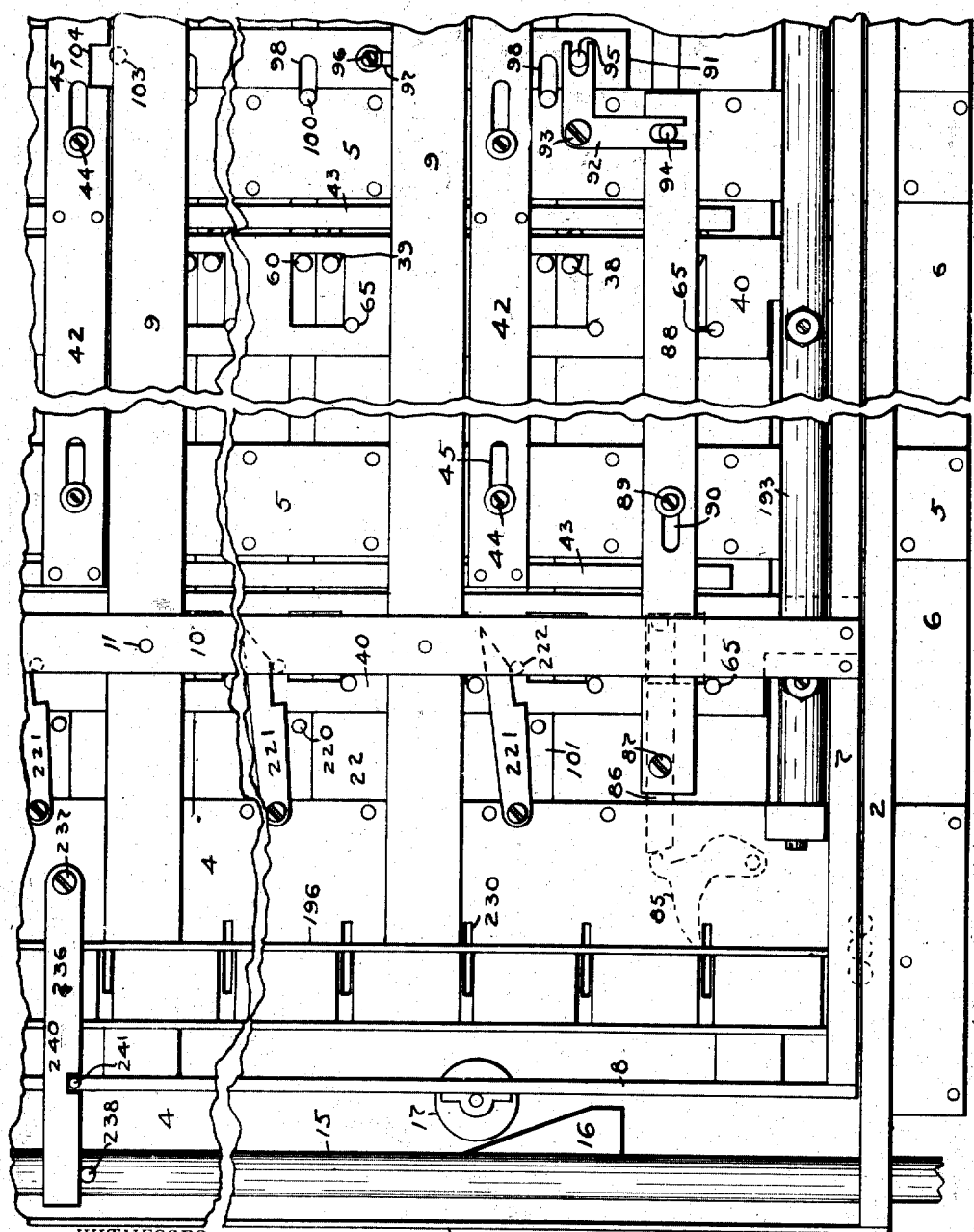

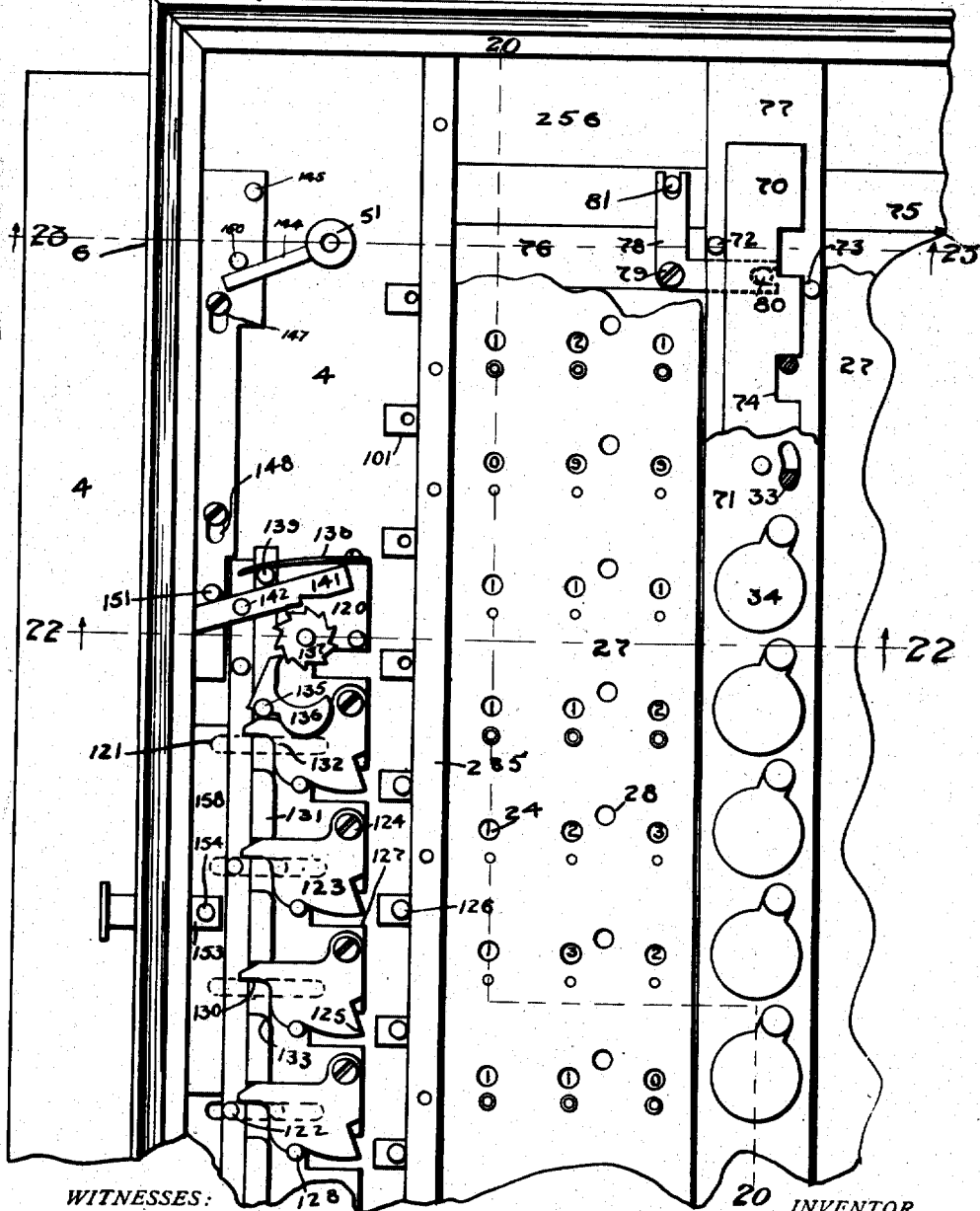

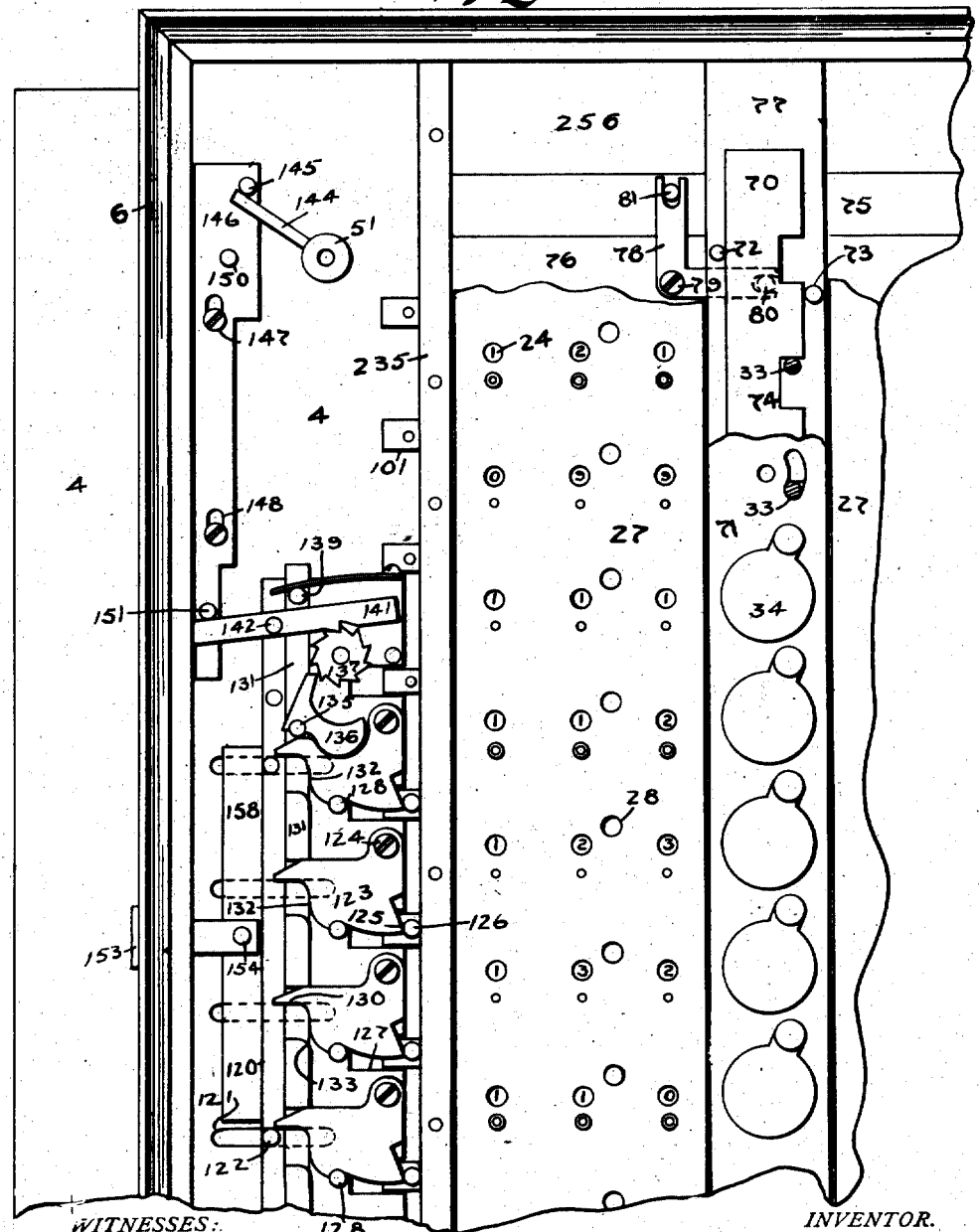

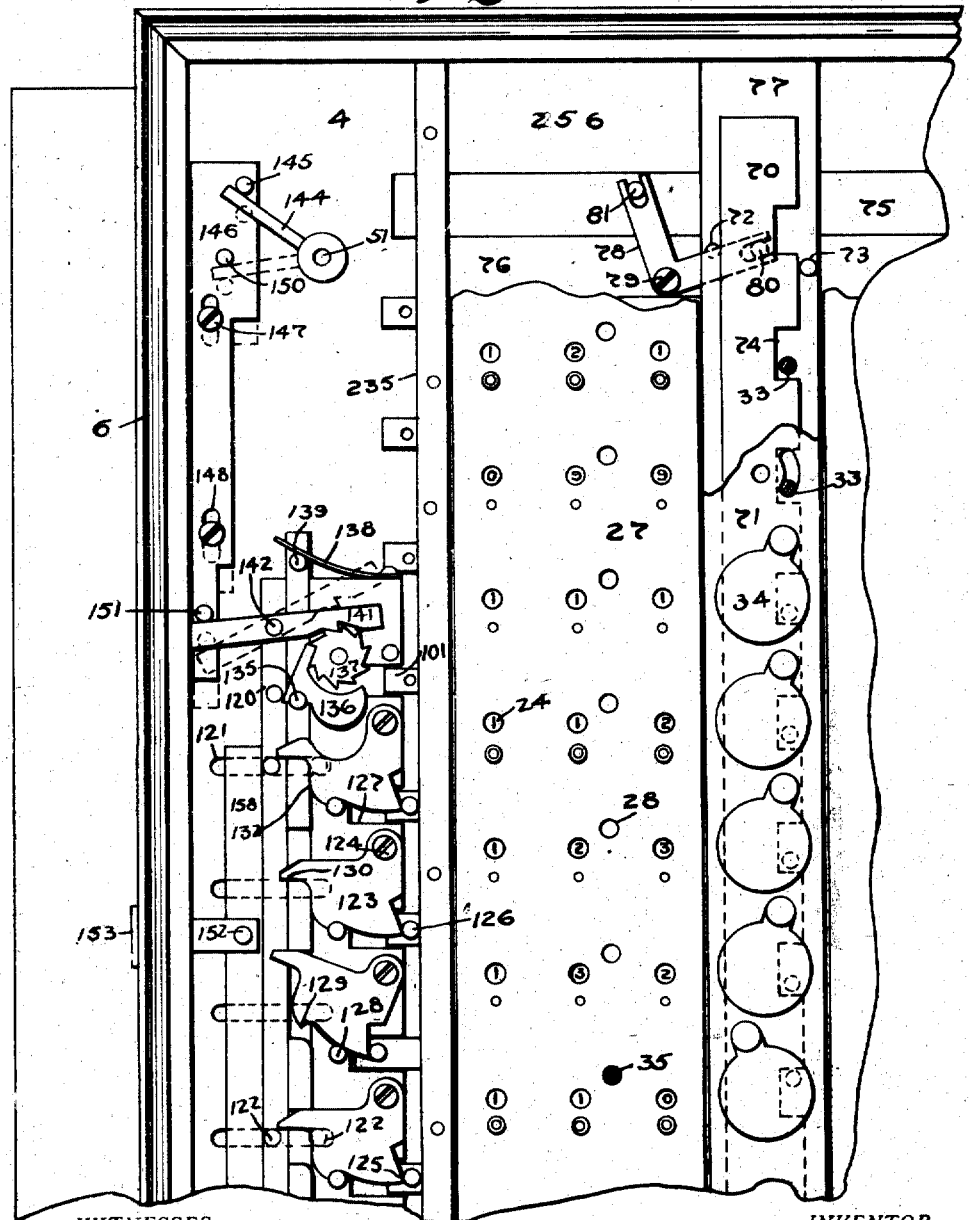

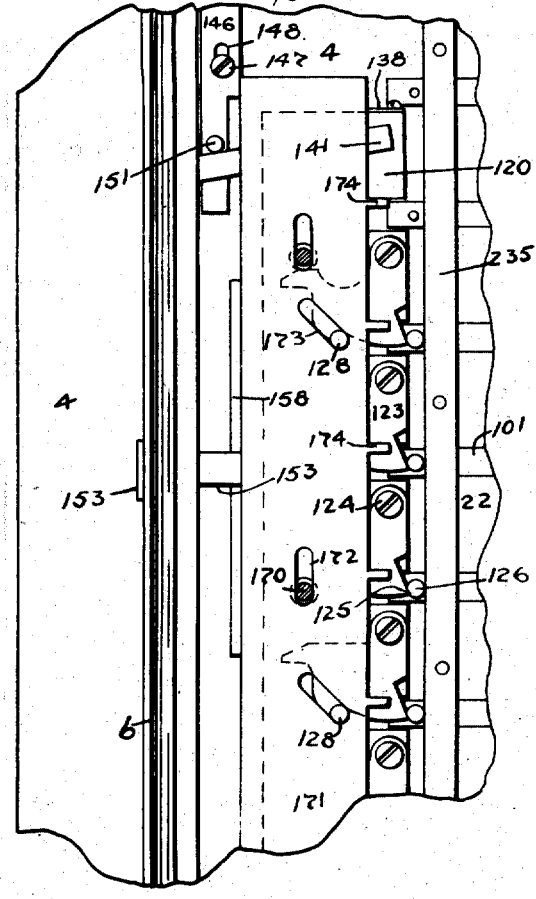

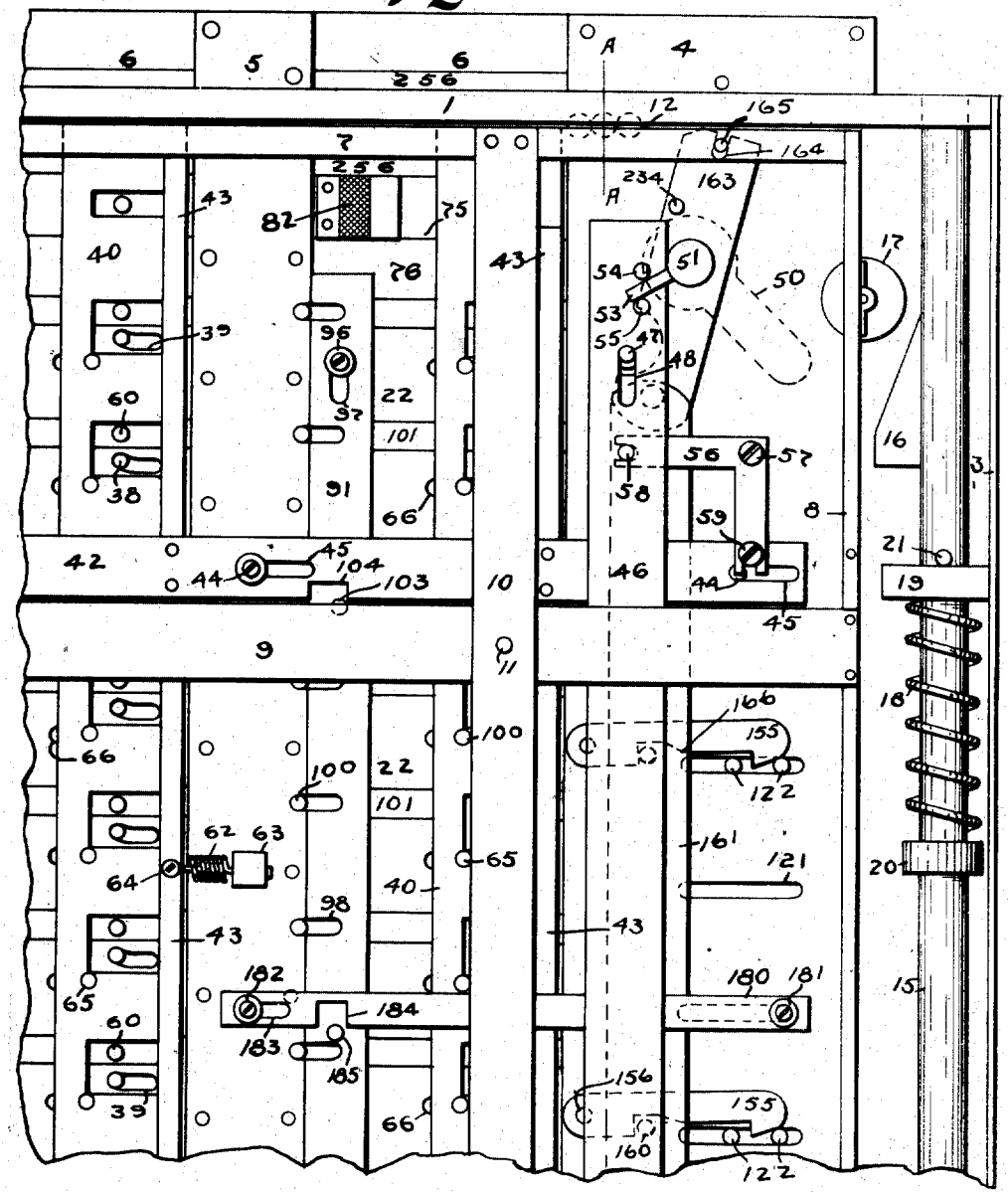

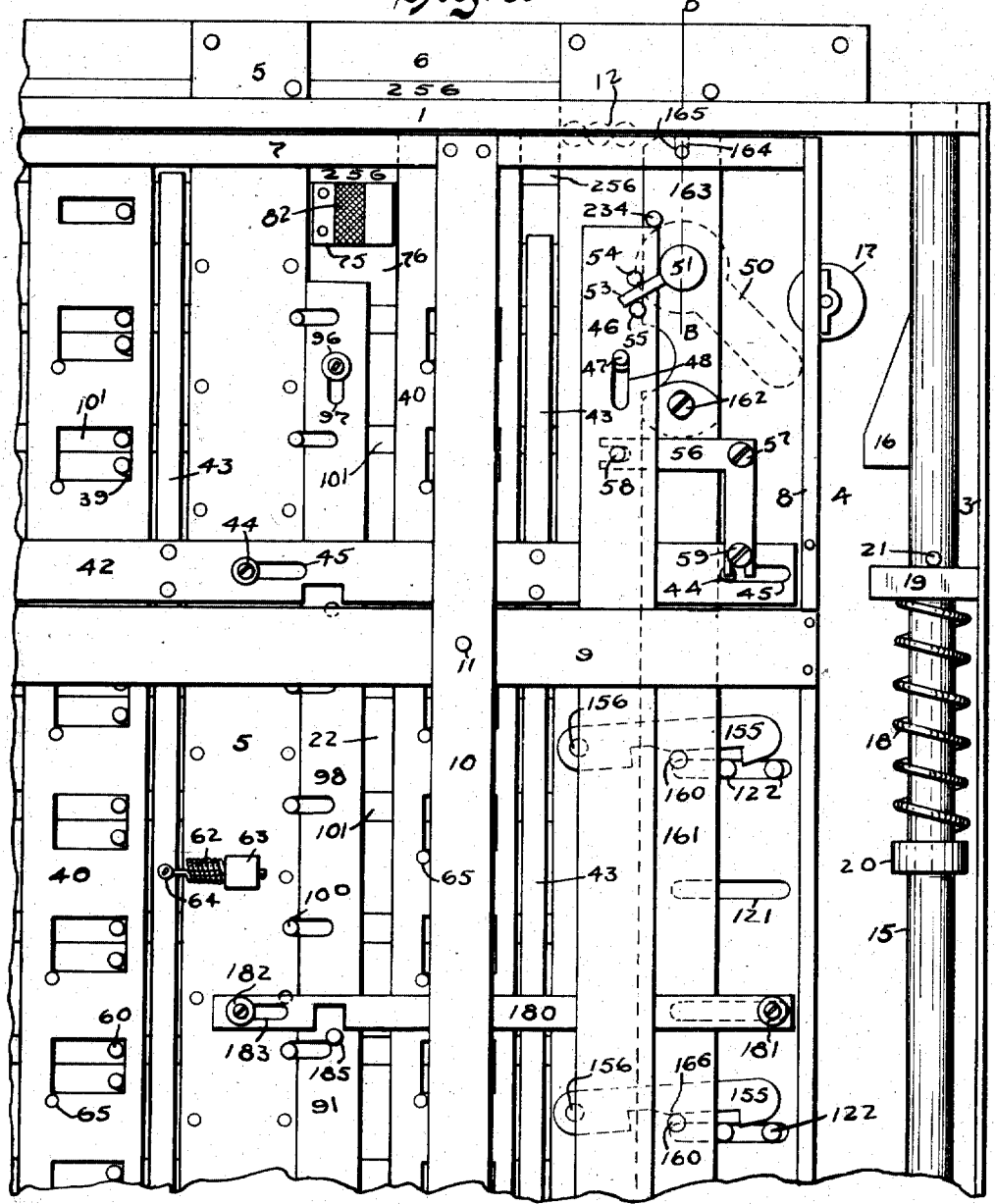

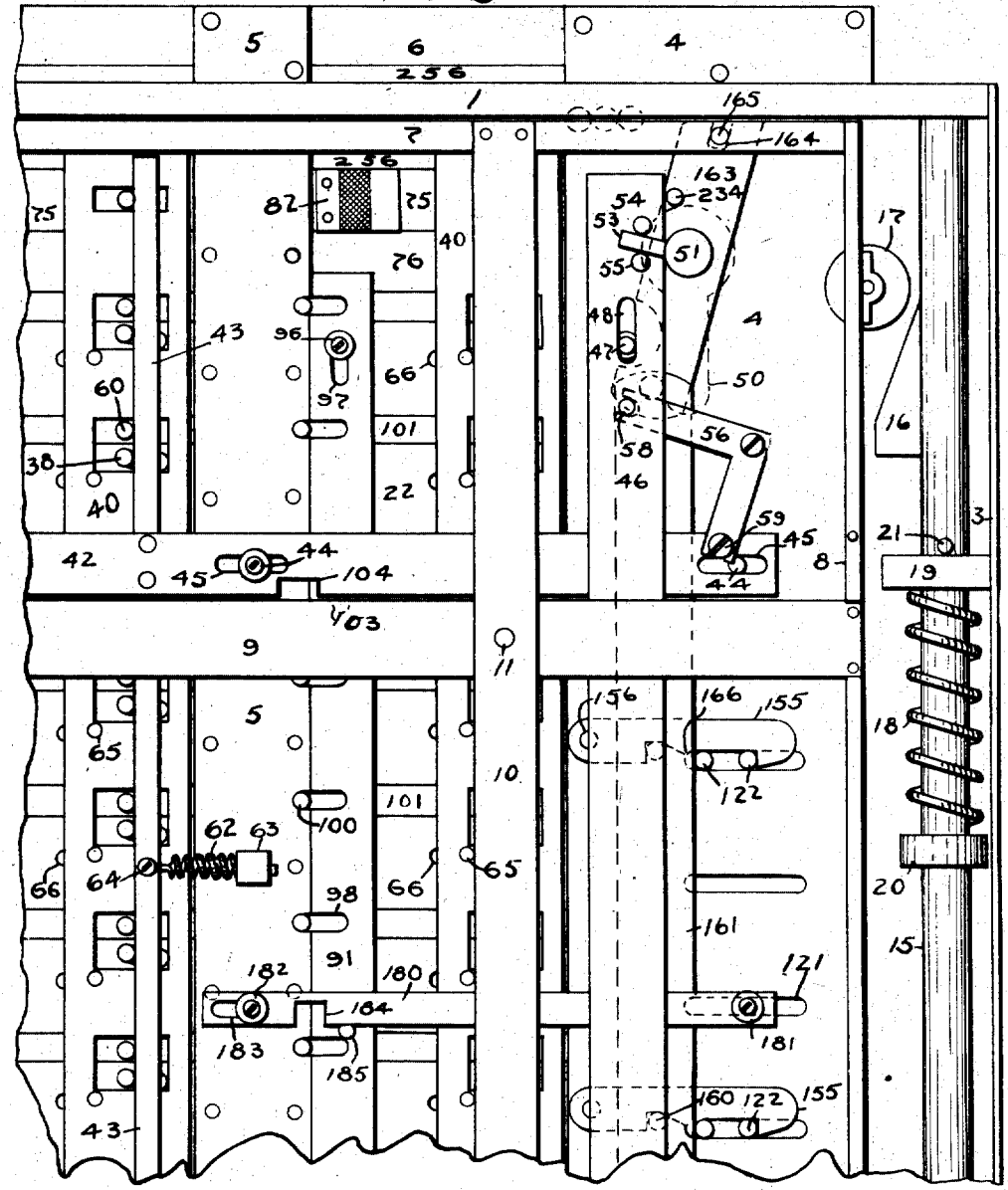

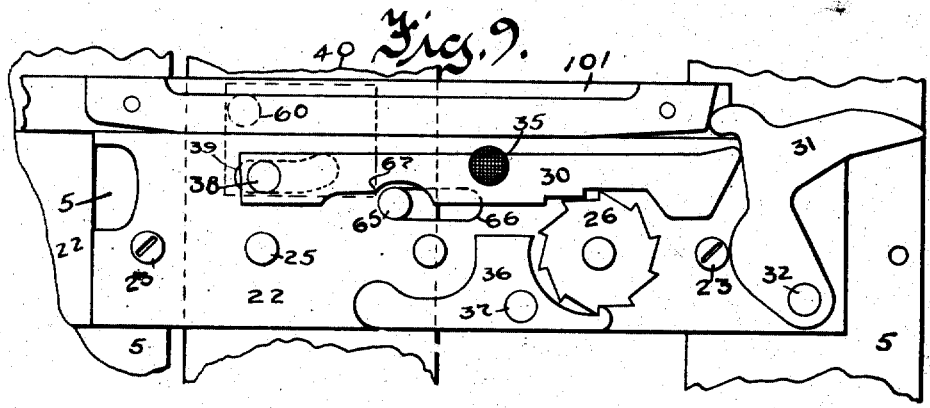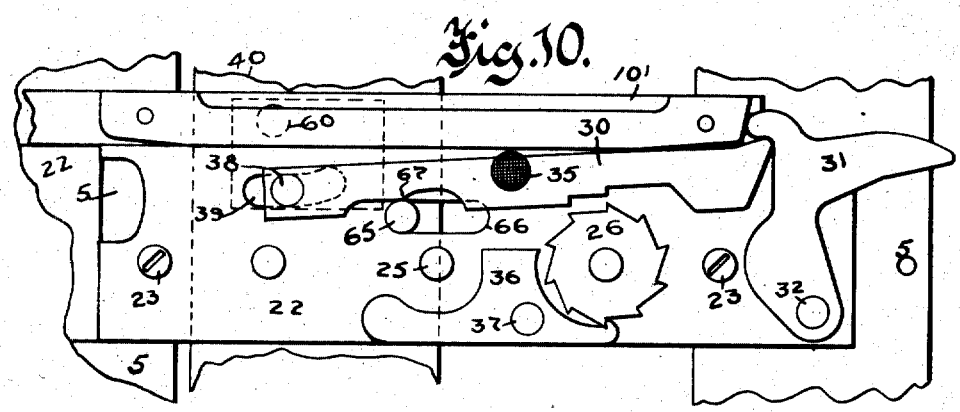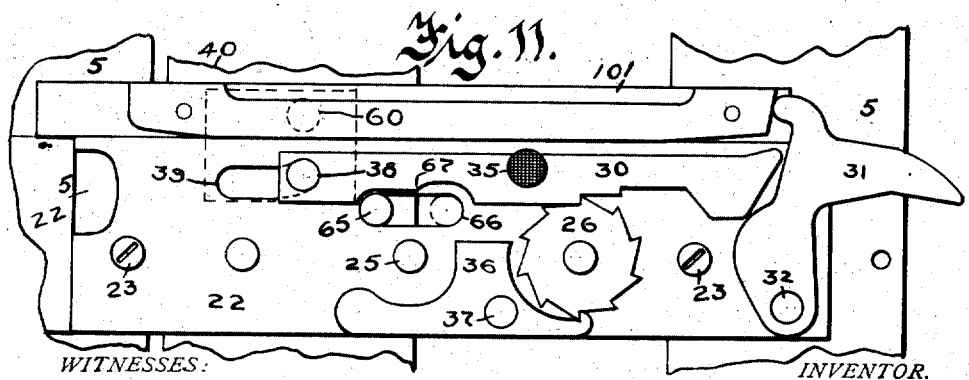

E. B. CUMMINGS.
VOTING MACHINE.
APPLICATION FILED APR. 27, 1901.

1,001,732.

Patented Aug. 29, 1911.
15 SHEETS—SHEET 9.

WITNESSES:
G. H. Blaker
Florence E. Bryan

INVENTOR.
Edwin B. Cummings
BY
V. H. Lockwood
His ATTORNEY.

E. B. CUMMINGS.
VOTING MACHINE.
APPLICATION FILED APR. 27, 1901.

1,001,732.

Patented Aug. 29, 1911.
15 SHEETS—SHEET 10.

WITNESSES:
G. H. Blaker
Florence E. Bryant

INVENTOR.
Edwin B. Cummings
BY
V. H. Lockwood
His ATTORNEY.

E. B. CUMMINGS.
VOTING MACHINE.
APPLICATION FILED APR. 27, 1901.

1,001,732.  Patented Aug. 29, 1911.
15 SHEETS—SHEET 11.

WITNESSES:
G. H. Blaker
Florence E. Bryant

INVENTOR.
Edwin B. Cummings.
BY
V. H. Lockwood.
His ATTORNEY.

E. B. CUMMINGS.
VOTING MACHINE.
APPLICATION FILED APR. 27, 1901.
1,001,732.
Patented Aug. 29, 1911.
15 SHEETS—SHEET 12.
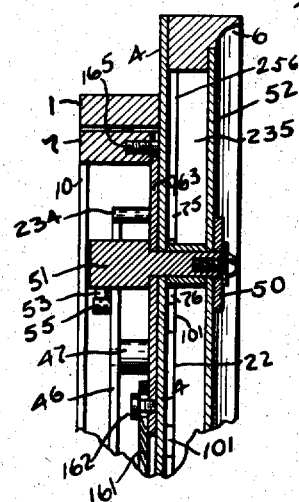
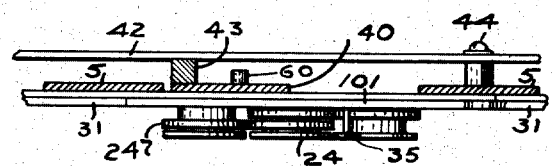
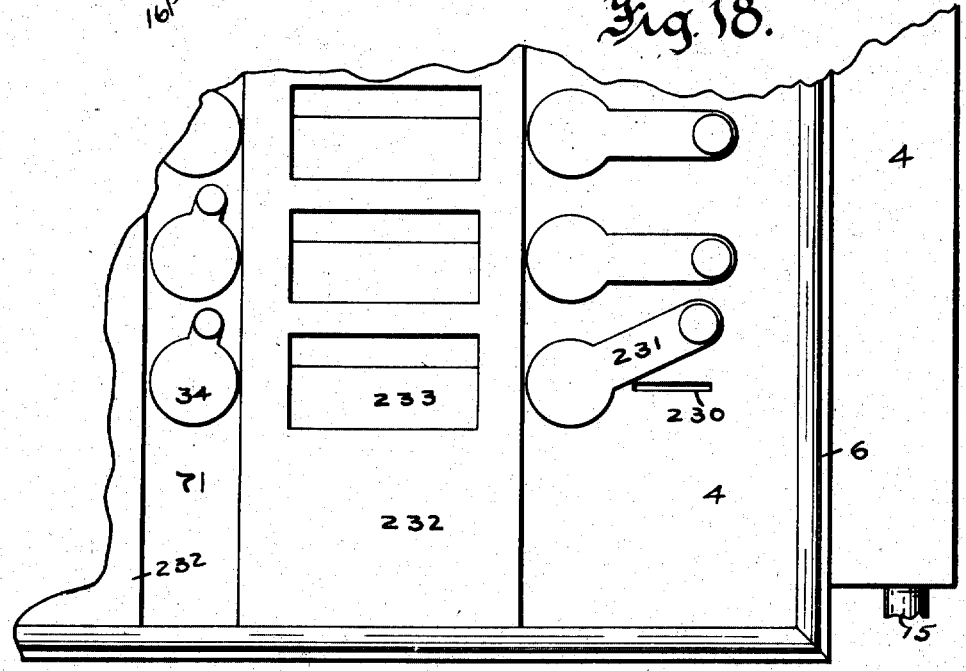
WITNESSES:
G. H. Blaker
Florence E. Bryant
INVENTOR.
Edwin B. Cummings
BY
V. H. Lockwood
His ATTORNEY.

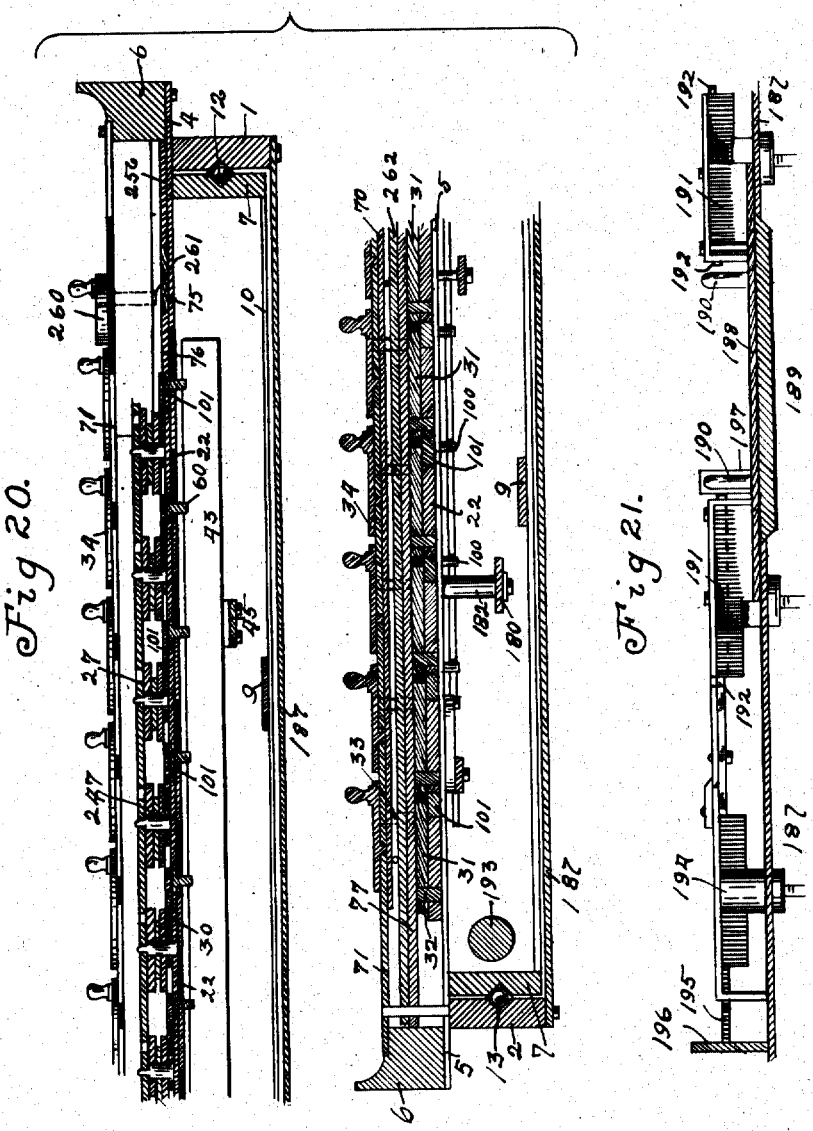

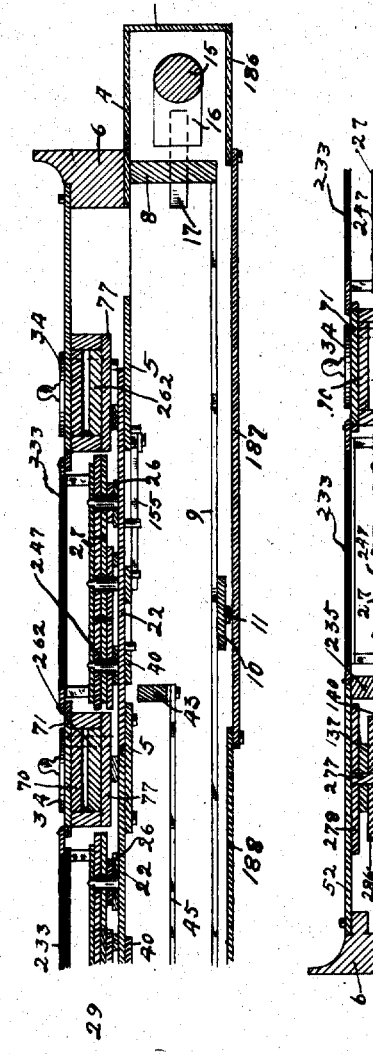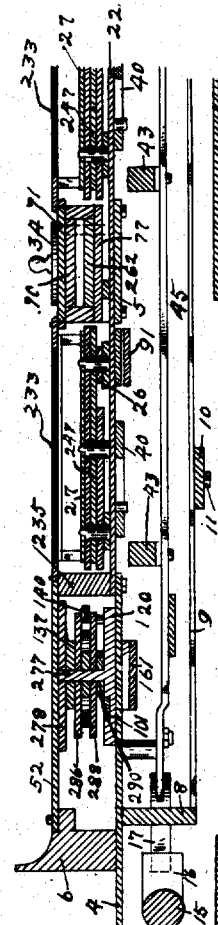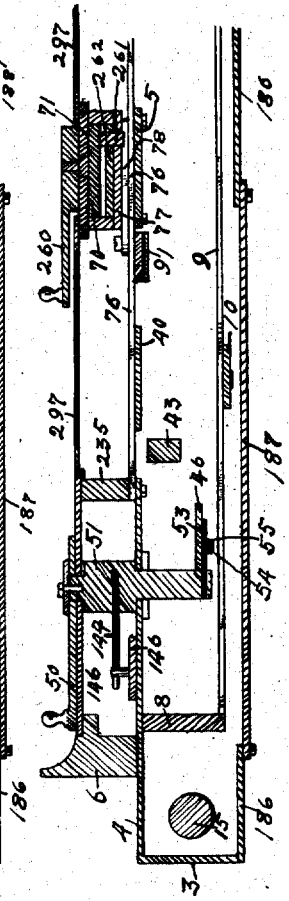

E. B. CUMMINGS.
VOTING MACHINE.
APPLICATION FILED APR. 27, 1901.
1,001,732.
Patented Aug. 29, 1911.
15 SHEETS—SHEET 15.
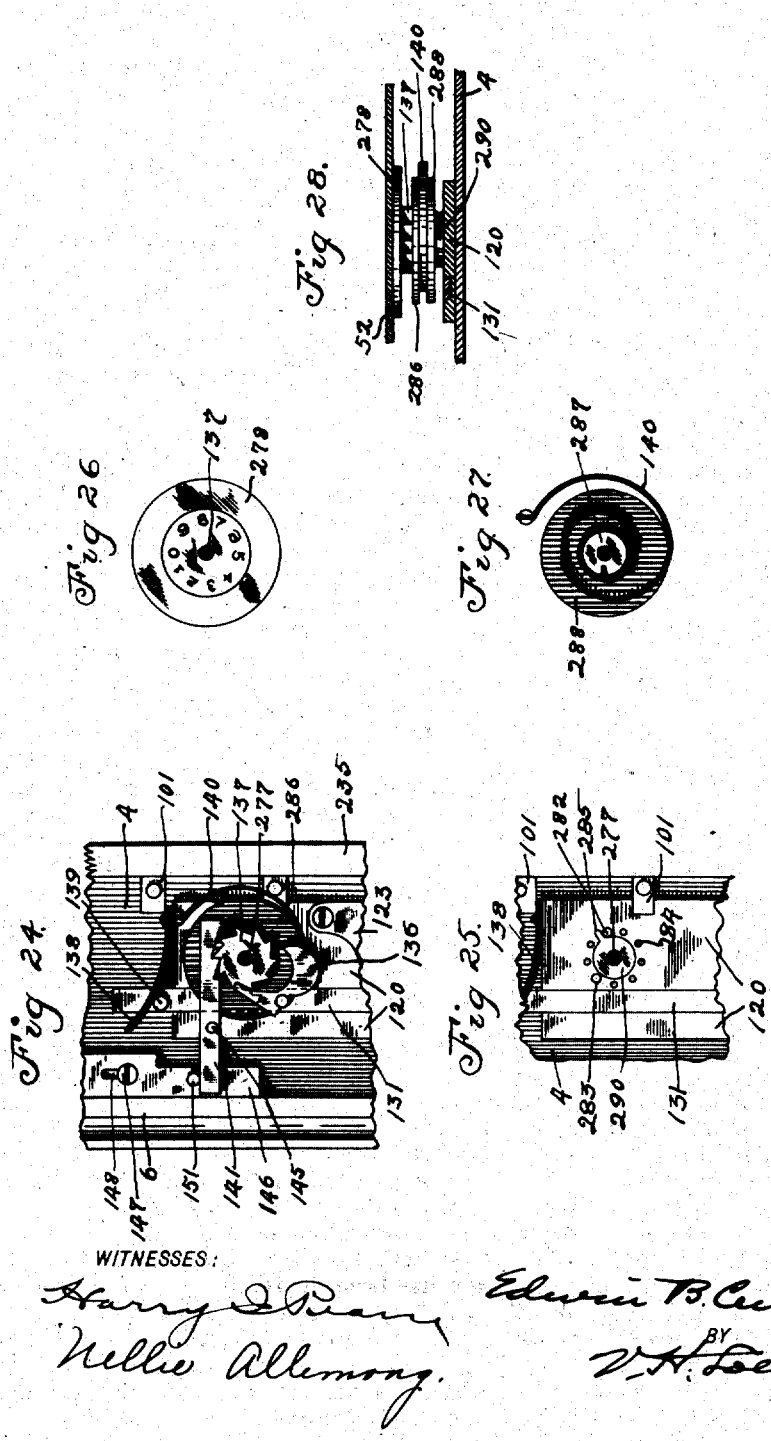

UNITED STATES PATENT OFFICE.

EDWIN B. CUMMINGS, OF INDIANAPOLIS, INDIANA.

VOTING-MACHINE.

1,001,732.

Specification of Letters Patent. Patented Aug. 29, 1911.

Application filed April 27, 1901. Serial No. 57,765.

*To all whom it may concern:*

Be it known that I, EDWIN B. CUMMINGS, of Indianapolis, county of Marion, and State of Indiana, have invented a certain new and useful Voting-Machine; and I do hereby declare that the following is a full, clear, and exact description thereof, reference being had to the accompanying drawings, in which like letters refer to like parts.
My object is to improve the construction and operation of voting machines in certain particulars, as will hereinafter appear.

These improvements relate chiefly to the kind of voting machines shown and described in my former Patents, Nos. 585,742 and 585,783, dated July 6, 1897, and my application filed March 8th, 1900, Ser. No. 7848.

One feature of my present invention consists in the means hereinafter shown whereby a voter may change his vote after he has operated the voting key or keys and before he leaves the booth or actuates the registering mechanism. To do this he can return all the keys and register actuating pawls which he has previously operated so that the parts of the machine are in the same position as when he entered the voting booth, and he is again free to vote as he pleases.
Another feature of this invention resides in the means for operating the repeater mechanism, means being provided for automatically returning the locking-bar and the key after each operation of the same.
Another feature of this invention is means for disclosing to the officers whether or not a person has voted or operated any part of the voting machine at all, without disclosing the part that he may have operated.
40. Another feature of the invention consists in the means herein provided for disclosing to the voter the fact that he has sufficiently operated the voting key, that is, that he has placed the register actuating pawl in position to actuate the registering mechanism.

Another feature of the invention consists in means for locking the vote disclosing mechanism and internal locking mechanism against simultaneous operation, consisting of a plurality of locks, one of which is within the control of an election officer, and one to be operated by an outside official which is in actuating engagement with the first lock, whereby the first lock will throw the second and the machine will thereby be internally locked, and the internal locking mechanism cannot be released until the vote disclosing mechanism is rendered inaccessible.

Another feature of the invention consists in the means herein shown for preventing a change of vote when an independent ballot mechanism is used and yet will allow a change of vote when the other part of the machine is used; also means are provided for locking the independent voting mechanism and the repeater mechanism against each other so a voter can operate only one.

These features of the invention will be understood from the accompanying drawings and the following description and claims.

Figure 13:
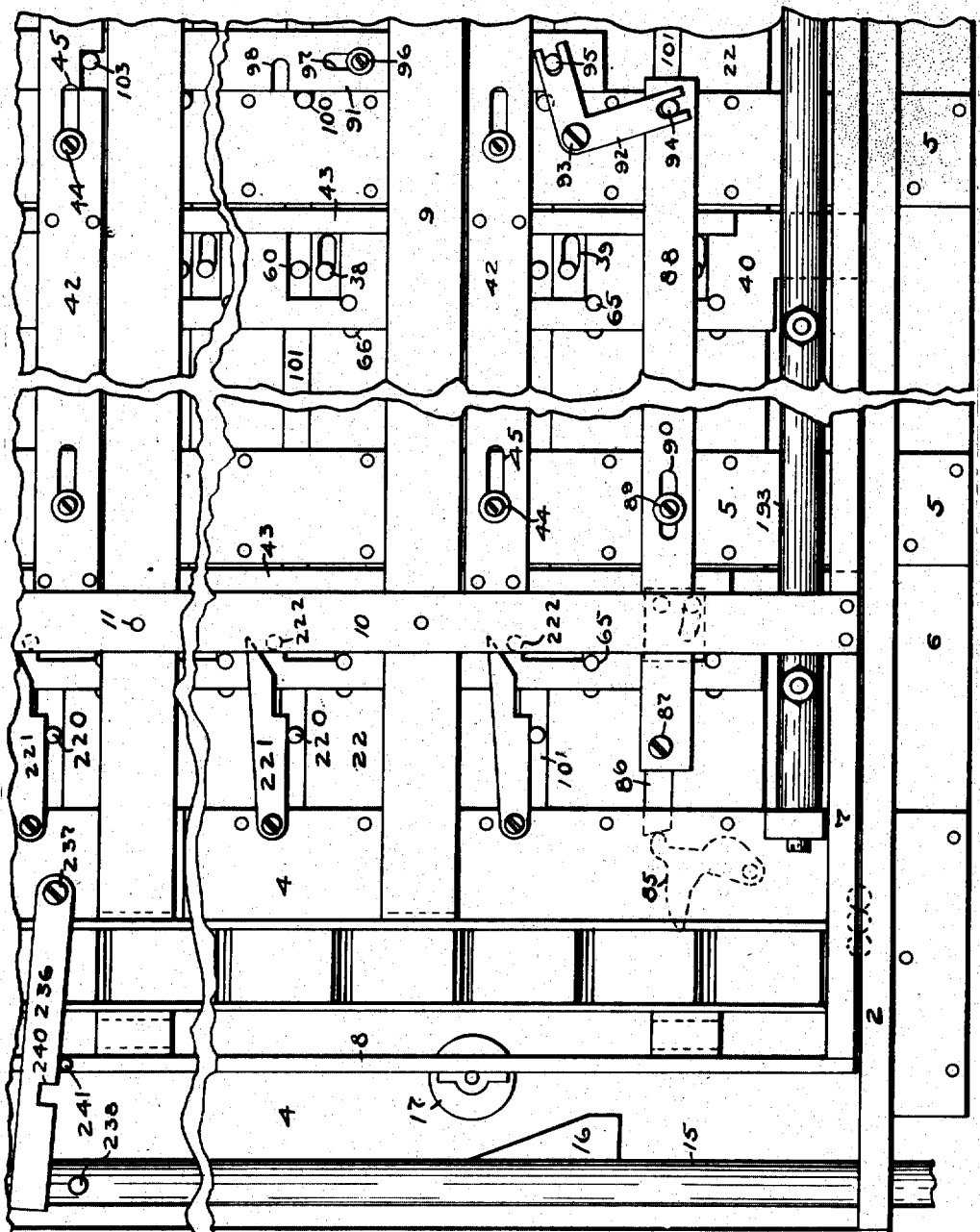
Figure 14:
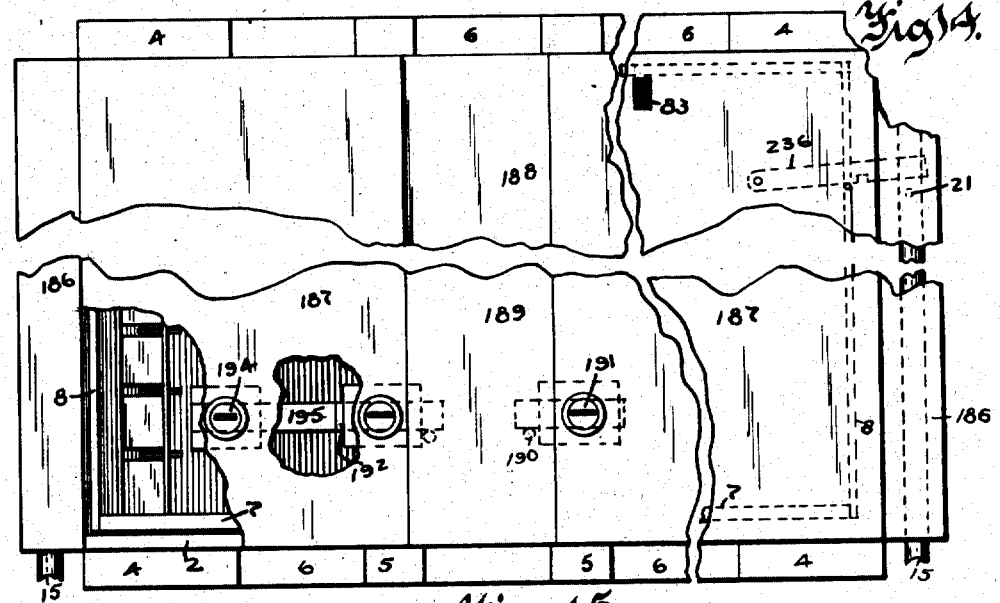
Figure 15:
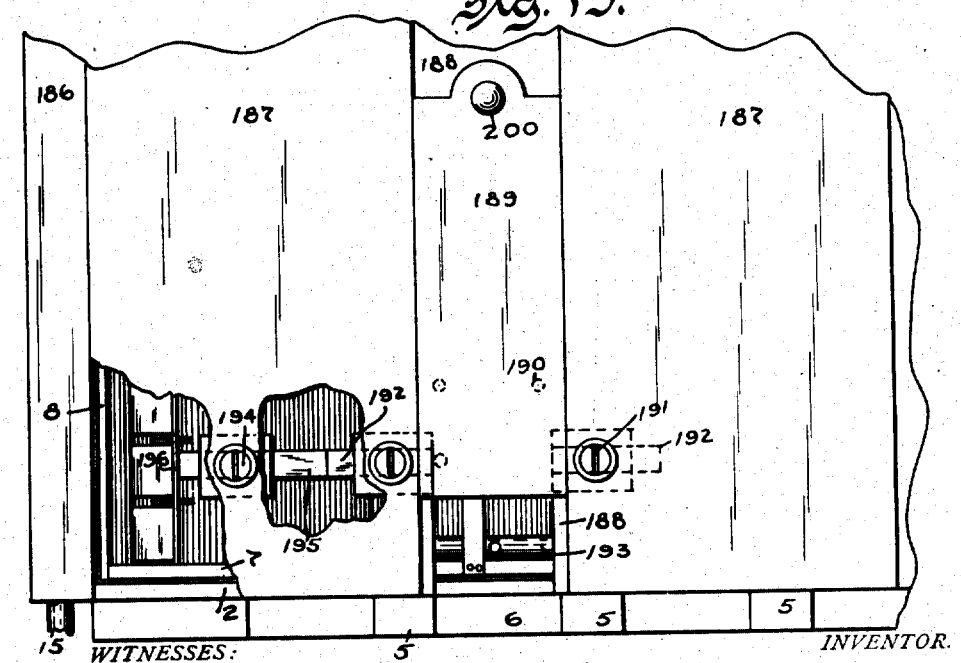

Figure 1 is an elevation of the upper left hand corner of the machine with the face plate and locking plate of the repeater mechanism and the ballot holder removed and parts broken away and showing the mechanism in its unoperated position. Fig. 2 is the same showing the repeater mechanism placed in actuating engagement with the locking-bars of the machine. Fig. 3 is the same showing one voting key near the lower end operated. Fig. 4 is an elevation of the lower left portion of what appears in Fig. 1, the repeater locking plate being in place and operated. Fig. 5 is the same as Fig. 4 with the parts unoperated and the repeater disconnected from the remainder of the machine. Fig. 6 is a rear elevation of the upper right corner of the machine with the back plate removed and parts broken away and showing the mechanism unoperated. Fig. 7 is the same showing the parts changed so as to be in position for voting and the keys have been operated, but the registers not actuated. Fig. 8 is the same showing the parts in position after the voter has changed his vote. Fig. 9 shows the register actuating mechanism after the voting key has been operated. Fig. 10 is the same after the vote changing mechanism has been partially operated. Fig. 11 is the same after the vote changing mechanism has been wholly operated. Fig. 12 is a rear elevation of the lower left corner of the machine with the back plate removed and parts broken away, showing the parts unoperated. Fig. 13 is the same showing the parts after an independent ticket has been voted. Fig. 14 is a rear elevation of the lower left corner with a portion of the back plate in place and parts broken away, showing the externally accessible locks with their bolts in one position. Fig. 15 is the same showing the bolts of the locks in their other position. Fig. 16 is a cross section on the line A—A of Fig. 6. Fig. 17 is a section on line B—B of Fig. 7. Fig. 18 is a front elevation of the lower right corner of the machine. Fig. 19 is a cross section over a register outlining the front plates. Fig. 20 is a vertical section throughout the machine on a crooked line, the first or upper portion being on a line cutting centrally the left row of counter revealing apertures, shown in Fig. 1, and the latter or lower portion extending on a line centrally through the voting keys to the bottom of the machine. Fig. 21 is a horizontal cross section of a portion of the back plates with the attached locking mechanisms on a line just above said locking mechanisms, as shown in Fig. 15. Fig. 22 is a horizontal section throughout the machine on a line through the center of the ratchet-wheel for controlling the repeater, as shown in Fig. 1 on the line 22—22. Fig. 23 is a horizontal section of the right-hand portion of the machine as you face it on a line cutting centrally the key for actuating the vote changing mechanism, as shown in Fig. 1 on the line 23—23. Fig. 24 is an elevation of the upper part of the repeater with the face plate and dial removed. Fig. 25 is an elevation of the means for limiting the repeater operation with certain front parts removed. Fig. 26 is an elevation of the dial for the means that limit the operation of the repeater. Fig. 27 is a detail of same showing the mounting of the coil spring. Fig. 28 is a central horizontal section through where the means for limiting the action of the repeater is mounted.

Referring now to the details of the construction set forth herein for the purpose of illustrating the general nature of my invention, a rigid frame is formed consisting of the top cross plate 1, to be seen in Fig. 6, which is preferably about one-half inch wide and one-quarter inch thick, and a similar bottom plate 2, seen in Fig. 12, and two side plates 3, one appearing in Fig. 12 and the other in Fig. 6, which are as wide as the top and bottom plates and are secured to them at their ends by any suitable means. To the front faces of the top and bottom plates 1 and 2 the vertical plates 4 and 5 are secured. Plates 5 are less than half the width of the plates 4, as appears in the drawings. Both of these plates are thin. The molding or auxiliary rectangular frame 6, seen in Fig. 1, is secured to the front faces of the plates 4 and 5.

A movable frame is mounted in the foregoing stationary frame, said movable frame appearing in Fig. 6 and consisting of the top and bottom bars 7, and the side bars 8, with the intermediate horizontal plates 9, and the intermediate vertical plates 10 secured to the rear faces of said bars 7 and 8, and secured together by pins 11. The said frame moves laterally and is held in place and guided in its lateral movement by the anti-friction balls 12 that fit in the corresponding grooves 13 in the adjacent faces of the top and bottom bars 1 and 2 of the stationary frame and the top and bottom bars 7 of the movable frame, as appears in Fig. 16. Said movable frame is actuated by the vertically movable rods 15 mounted one on each side of the machine, the upper ends of said rods being mounted in the top bar 1 of the stationary frame and the lower ends thereof in the bottom bar 2 of the stationary frame. An inwardly extending inclined block 16 is secured to said rods 15 that engages the roller 17 mounted on the movable frame. The construction is the same on each side of the machine so that the movement of one of said rods will shift said frame in one direction and the movement of the other rod will shift the frame in the opposite direction. Said rods are returned to the normal or downward position by the spiral springs 18 acting between the stationary plate 19 secured to the end bar 3 of the stationary frame and the collar 20 secured on the rod 15, and they are limited in their downward movement by the pins 21. Means for actuating the rods 15 are not shown but they may be actuated by any suitable means such as the door of the booth or a lever that is moved by the voter as he moves into or out of position in front of the machine, as is fully shown in my said application.

A series of plates 22 to be seen in Figs. 9, 10 and 11 are provided in the machine, one for each candidate, and placed in vertical and cross rows. The ends of said plate 22 are secured by the screws 23 to the vertical plates 4 and 5 of the stationary frames. In the cross row the ends of said plates 22 abut and in the vertical row they are separated by the locking-bars 101. All of these plates 22 are in the same plane. Each carries a complete set of registering and indicating wheels and parts for actuating them. The registering and indicating mechanism is shown in my said application. The holes 25 are for mounting the registering wheels 24 and the ratchet wheel 26 drives the registering wheels. Over each vertical series of the indicating wheels 24 a plate 27 is mounted, as appears in Fig. 1, having apertures for revealing the numerals on the indicating wheels, as set forth in my said application. I provide a series of apertures 28 in said plate 27, one for each candidate, for revealing to the voter a signal to indicate that he has completely operated the parts that are necessary to actuate the registering mechanism. As appears in Fig. 9, 30 is a sliding pawl for actuating the ratchet wheel 26 of the registering mechanism. It is moved into position for actuation by the rotary arm 31 pivoted on the pin 32 that is actuated by the pin 33 on the voting key 34, as is explained in my said application. On this sliding pawl 30 I place a colored pin or disk signal 35, preferably red or some bright color, that registers with the aperture 28 when the pawl 30 has been moved into position for actuating the registering mechanism, as shown in Figs. 9 and 10. When the pawl 30 is in any other position, the signal 35 will not be disclosed through the aperture 28.

As stated the ratchet 26 of the registering mechanism is actuated by the sliding pawl 30, as set forth in the said application. The gravity pawl 36 pivoted on the pin 37 prevents the return of the ratchet wheel 26.

The method of voting with this machine is the same as that shown and described in my said application, and is briefly as follows: The voter, by means he must necessarily move, such as a voting booth door, as he takes his position in place for voting, will, through the rod 15 on one side of the machine, move the movable frame heretofore described, and said movable frame will unlock all parts of the machine and put them in position for operation. The voter then operates the voting keys opposite all the candidates for whom he desires to vote and such operation of the keys moves the pivoted arm 31 from the position shown in Fig. 11 to the position shown in Fig. 9. Said pivoted arm moves the sliding pawl 30 to the left, putting it in position to actuate the register when it is moved in the opposite direction. When he has thus voted for all the candidates he desires, and leaves the voting booth or the position for operating the machine, he moves the movable frame heretofore described by means he must necessarily actuate, such as the exit door acting on one of the rods 15. This movement of the movable frame moves all the pawls 30 to the right by means of the pins 38 extending from said pawls through the slots 39 in the plates 22. The sliding pawls 30 are thus actuated by the vertical plates 40 secured at their upper and lower ends to the top and bottom bars 7 of the movable frame. The plates 40 have square apertures into which the pins 38 extend, as shown in Fig. 6. There is no difference in this particular mechanism or its operation from what appears in my said application, and for fuller understanding reference is made to said application.

To enable the voter to change his vote after he has operated some of the voting keys of the machine, I provide the following means which may be operated for that purpose at any time before he leaves the voting machine. A vote changing movable frame is provided consisting of the cross plates 42 and the vertical bars 43 which are secured together by pins or rivets and guided in lateral movement by screws 44 secured to the vertical plates 5 of the stationary frame and extending through horizontal slots 45 in the plate 42. The vote changing movable frame is located in substantially the same plane as and within the main movable frame, as appears in Figs. 6, 7 and 8. Said vote changing movable frame is operated by the following means. The plate 46 is mounted on the pins 47 in plate 4, which pins extend through the slots 48 and permit the vertical movement of plate 46. Said plate is also guided and held in place by the cross plates 9 of the main movable frame, as appears in Figs. 6, 7 and 8. Said vertically movable plate 46 is actuated by the lever or vote changing key 50 shown in Fig. 17 and in dotted lines of Figs. 6, 7 and 8. Said key 50 is mounted on the shaft 51 that is mounted in plate 4 of the stationary frame and the face plate 52 and carries the pin 53 that extends between a pair of pins 54 and 55 in plate 46. When the key 50 is operated, it changes the parts from the position shown in Fig. 7 to the position shown in Fig. 8. The movement of the plate 46 is transmitted to the vote changing movable frame through the bell crank 56 pivoted on the screw 57 secured in the plate 4 and having a slot in one end to receive the pin 58 in the plate 46 and a slot in the other end to receive the pin 59 in the plate 42.

The vertical movement of plate 46 causes the movement of the vote changing frame to the left, as appears in Fig. 8, and such movement causes the bars 43 of said frame to engage the pins 38 on the pawls 30 and also the pins 60 on the sliding locking bars 101, as shown in Fig. 7, and moves any of the said pawls and locking bars that may have been operated to the normal or unoperated position, as appears in Fig. 8, and puts these parts in the same position as they were before they were originally actuated by the voter. As soon as the lever or key 50 has been operated for the foregoing purpose and is released, the spring 62, seen in Figs. 6, 7 and 8 will return the vote changing movable frame to its normal position, as appears in Fig. 6. Said spring 62 is secured at one end to the stationary vertical plate 5 by the pin 63 and at the other end is fastened by the screw 64 to the vertical bar 43 of the vote changing movable frame.

To prevent the sliding pawl 30 from actuating the registering mechanism when it is moved to the right, as appears in Fig. 10, by the vote changing mechanism above described, I provide a pin 65 for each pawl 30 secured to the vertical bars 40 of the main movable frame and extending through the slot 66 in the plate 22, as appears in Fig. 9. While the voter is in the booth or in position to operate the machine, the pins 65 are in the position shown in Figs. 9 and 10. When the pawls 30 are moved to the right by the vote changing movable frame acting on the pins 38, the main movable frame is stationary so the pins 65 remain unmoved in the position shown in Figs. 9 and 10. As the pawls 30 move to the right, the shoulder 67 on the pawl rides up on the pins 65 thus lifting the pawl out of engagement with the ratchet wheel 26 of the registering mechanism, as appears in Fig. 10. In this way the pawl 30 moves back to the unoperated position without actuating the registers. Fig. 10 shows this partial movement and Fig. 11 the complete movement of the pawl by the vote changing movable frame. When, however, the voter leaves the voting booth and moves the main movable frame, as explained in my said application, the pins 65 being secured to the movable frame will move to the right simultaneously with the pins 38 that are engaged by the movable frame, and thereby the pins 65 will keep in advance of the shoulders 67 and out of the way, as appears in dotted lines in Fig. 11.

Whether a voter has actuated any voting key is disclosed by the following means. A vertically movable bar 70 is shown similar to and almost a duplicate of the straight ticket bar 262 which is actuated by the straight ticket key 260 through the pin 261, seen in Fig. 20, shown in my said application. The plate 70 is mounted immediately under the voting key bar 71 and over plate 77 and is guided between the guiding pins 72 and 73. Said bar 70 has notches 74 in one side through which the pins 33 from the voting keys extend. Normally the shoulder formed by the notches 74 in the plates 70 rests upon the pins 33 when no key has been operated, as appears in the upper part of Figs. 1 and 2. The first key operated causes the pin 33 thereof to elevate the plate 70 to the position shown in Fig. 3, where the lower key is operated. This movement of plate 70 moves laterally the plate 75 that is mounted between plates 76 and 256. As seen in Fig. 1, a bell crank 78 is mounted on the pivot 79 with one end notched to receive the pin 80 extending upward in the vertically movable plate 70, and the other end is notched to receive the pin 81 in the horizontal plate 75. The result of this construction is that the first voting key 34 which is actuated by the voter will elevate the plate 70 and that, through the bell crank 78, will throw the plate 75 somewhat to the left and reveal a signal 82 secured on the rear of said plate 75 and appearing through the aperture 83 in the back plate 187, as appears in Fig. 14.

With the back of the voting machine exposed to the election officers, they can tell whether the voter has operated any voting key or voted while he is in the booth or in front of the voting machine. Yet, while it discloses this fact, it does not disclose what part of the machine the voter has actuated, as the actuation of any key will throw said signal into position to be seen.

The means and method of voting independent ballots in this machine have been explained in my said application. The independent straight ticket voting key 231, as explained in the said application, actuates the rotary arm 85, shown in dotted lines, from the position shown in Fig. 12 to that shown in Fig. 13 and such movement moves the locking bar 86 which is like the other locking bars excepting that it is secured by the screw 87 to the horizontally movable plate 88 which is mounted on the screw 89 in the plates 5 of the stationary frame. The screw 89 extends through the slot 90 in the cross plate 88. The movement of said plate 88 is transmitted to the vertically moving plate 91, the connection between the two being by the bell crank 92 pivoted at 93 to the stationary plate 5 and having one notched end to receive the pins 94 in the plate 88. The other end is also notched to receive the pin 95 in the plate 91, as is seen in Fig. 12. The plate 88 is secured to the rear faces of the bars 43 of the vote changing movable frame. The plate 91 is beside one of the stationary plates 5 in the same plane and is held in place by the screws 96 in the plates 22 and which extend through the slots 97 in plate 91 to guide and limit the vertical movement of said plate. On one side plate 91 has horizontal notches or recesses 98 adapted when the plate is in its downward and normal position to register with the pins 100 extending rearward from the locking bars 101. When said plate 91 is elevated from the position shown in Fig. 12 to that shown in Fig. 13 the notches 98 will not register with the pins 100, and therefore the locking bars cannot be moved to the right, as appears in Figs. 12 and 13.

The locking bar construction for controlling and interlocking the voting keys and other parts of this machine is the same as that set out in my said application. As appears in Figs. 9, 10 and 11, when the rotary arm 31 is thrown by the voting key from the position shown in Fig. 11 to that shown in Fig. 9, it engages and pushes the locking bar 101 to the left. If said locking bar is prevented from such movement to the left by the bar just described, the voting key cannot be actuated. The result therefore of the construction above described is that when one votes an independent straight ticket by throwing the key controlling the rotary arm 85 shown in dotted lines in Figs.

12 and 13, he locks all the locking bars from movement and consequently all the voting keys on the regular tickets. This construction and arrangement so far as locking the locking bars and voting keys from operation when an independent straight ticket key is operated is not different in principle from what is shown in my said application, but that key is located in the lower right corner of the machine here shown, while in my said application it was shown in the upper right corner.

The object of the foregoing explanation is to explain the following construction. When a person votes an independent ballot, he cannot change his vote for he cannot withdraw the ballot he has deposited in the machine, so it is necessary that the vote changing mechanism in the machine be locked by such act of the voter to prevent him from voting more than once for the same office or ticket. This result is accomplished by locking the vote changing movable frame through the means of the pin 103 in the plate 91 to be seen in Figs. 12 and 13, and also in the central portion of Figs. 6, 7 and 8, that enters the notch 104 in the cross plate 42 of the vote changing frame and engages said plate when the plate 91 is elevated. When the voter leaves the voting booth or machine external means (not here shown) moved by the voter for elevating the rod 15 throws the main movable frame to the left, as appears in Fig. 6 or to the right when viewed from the front of the machine, and returns the independent ticket voting key to its normal position, the same as the other keys. When any other independent voting key is operated, the pin 220 on its locking bar 101 engages the shoulder of the latch 221 pivoted to the stationary plate 4 and prevents a return movement of the locking bars by the vote changing frame; hence, the latter cannot be operated. When the main movable frame is operated the pins 222 on plate 10 of said frame engages the inclined lower edge of the latches 221 and lifts them above pin 220 on the locking bars, which permits the return movement of the locking bars. Pins 222 are shown dotted in Figs. 12 and 13.

The general features of the repeater mechanism in this machine are substantially the same as what are set forth in my said application. The improvements thereon I will proceed now to explain, as they appear in Figs. 1, 2, 3, 4 and 5, 22 and 24 to 28. A laterally sliding repeater plate 120 is mounted on the plate 4 of the stationary frame. The plate 4 has the horizontal slots 121 through which the pins 122 from the plate 120 extend to guide and limit the movement of said plate. The plate 120 carries a series of oscillatory pawls 123 pivoted at 124 to the plate 120 with a shoulder or point 125 resting against the pin 126 on the locking bar 101. The right edge of the plate 120, as appears in Fig. 1, is notched at 127 to permit the movement of the end of the locking bars as is seen in the lower left portion of Fig. 3. A pin 128 is secured to the plate 120 to limit the reverse movement of the pawls 123 by engaging the shoulder 129. The nose 130 of the pawls 123 supports the vertically movable block 131 which moves and is embedded in a corresponding groove in the plate 120, said groove not being shown independent of the blocks 131. There is a vertical series of the blocks 131 resting upon each other so that when one is moved upward, all above are moved.

When a voting key is operated, it throws the locking bar 101 to the left, as appears in Fig. 3 and rotates the pawl 123 as described. To prevent the simultaneous operation of two or more voting keys, I provide the following construction. The pawls 123 have a recess forming a shoulder 132 about midway between the nose 130 and the shoulder 129 heretofore described. The blocks 131 have on them projections or shoulders 133 about midway. As the blocks are moved up by the operation of a voting key and the intermediate means, the shoulder on the block 133 engages the shoulder 132 on the pawl that has just been described, for as the pawl is rotated said shoulder 132 moves into the path of the projection 133 on the block. If two voting keys are simultaneously operated the blocks 133 would wedge between them and against them before the operation had proceeded far enough to produce any result in the machine. On this account only one pawl 123 can be operated at a time.

Since the vertical movement of the locking block 131 elevates the blocks above it, the pin 135 on the long top block elevates the pawl 136 that actuates the counter ratchet 137 and rotates the same one notch. The pin has also the function of enabling the nose of the top pawl 123 to elevate the top block 131 and move the ratchet as just described.

The series of blocks 131 and the pawl 123 which have been actuated by the operation of a voting key are returned to normal to enable the voter to operate another voting key by the flat spring 138 secured on the top of the plate 120 and bearing downward on the pin 139. The arrangement of the parts controlling the operation of the repeater are substantially the same as in my said application and will be understood from the following description: By referring to Figs. 22 and 24 to 28, a pin 277 is mounted in plate 120, and carries the disk 278, ratchet 137, disk 286, hub 287, disk 288, and a stop disk 290, all of which are secured together side by side to rotate on said pin. A coil spring 140 has its inner end secured to hub 287, and its outer end to plate 120. The function of the spring is to return the dial 278 and associated parts to normal after a voter has left the booth. At such time the pawl 136 is out of engagement with the rachet, as the upper sliding block 131 is lowered by spring 138 and unelevated when the machine is reset or the repeater moved to the left from its operative position, as seen in Fig. 1. The bar 141 is also disengaged from the ratchet 137 at such time, as is shown also in Fig. 1. The number of votes that may be cast by use of the repeater is limited by limiting the rotation of the ratchet 137. This is done by the pin 282 in plate 120, the pin 283 adjustably located with reference to pin 282 by being inserted in one of the holes 284, and the lug 285 on the disk 288. If three votes with the repeater are the desired limit, the election officials set the pin 283 in the third hole from the pin 282. As each voting key is operated the ratchet will be actuated one notch until after the third vote. When the third key is operated, lug 285 will engage pin 283, and further operation of the locking bars 101 and swinging pawls will be stopped because the locking blocks 131 cannot be moved upward again against pawl 136 and ratchet 137, as they are locked by the pin 283. If five votes are permissible, pin 283 is set in the fifth hole, and so on. The dial has numerals on it, seen in Fig. 25, to indicate to the voter, through an aperture, not shown, in the face plate 71, how many times he has voted with the repeater. This is explained for the purpose of bringing out in this patent the connection with the means for changing one's vote, as appears in Figs. 1, 2 and 3. The pin or shaft 51 on which the vote changing key or lever is secured extends through the plate 4 toward the front of the machine, and has an arm 144 that engages the pin 145 on the vertical sliding plate 146 mounted on the plate 4, as shown in Fig. 3 and holds the same up out of engagement with the pawl 141 while the vote changing mechanism is in its unoperated position. Pins 147 in the plate 4 extend through the slots 148 to guide and limit the movement of the plate 146. When the vote changing key or lever 50 is actuated, the arm 144, shown in Fig. 3, is turned down to the dotted position and in such movement engages the pin 150 in the plate 146 and pushes said plate 146 down so that the pin 151 at the lower end of the said plate engages the outer end of the pawl 141 pivoted on pin 142, thus causing said pawl to disengage the ratchet 137 so that the spring 140 will return it to normal. As soon as the vote changing key or lever is released by the hand, as has been explained heretofore, the springs 62 return the vote changing frame to normal since its work has been done, and that also returns the frame 144 to its upper position, thus elevating the plate 146 out of engagement with the pawl 141, and then the voting can be repeated just as if the voter had not used the repeater mechanism before.

As is explained in my said application, the repeater is moved into engagement with the rest of the voting machine by the voter. As is seen in Fig. 1, a push rod 153 is laterally movable through an aperture (not shown) in the side molding or frame 6, and is pivoted at 154 to the plate 158 that engages, but is independent of, the plate 120. When said push rod is pushed to the right, it is moved from the position shown in Fig. 1 to the position shown in Fig. 2, and slides the plate 120 carrying the repeater mechanism so that the parts thereof will be engaged by the pins 126 on the locking bars. When the repeater is not used, the parts are in the position shown in Fig. 1 where they will not be engaged by the locking bars. When the mechanism is moved into engagement with the rest of the machine it is caught and held in such position by the latches 155 pivoted by the pins 156 on the plate 4, as appears in Fig. 8. There the catch is shown engaging one of the pins 122 that extends rearward through the plate 120 and through the slot 121 in said plate 4.

After the voting is done the repeater mechanism is returned to its disconnected postion, as shown in Fig. 1, by the main movable frame which resets all parts of the machine. In the first place the latches 155 are disengaged from the pins 122 by the pins 160 in the vertical plate 161 pivoted at the upper end by the pivots 162 to the short plate 163 which is pivoted on the shaft 51 that is mounted in the stationary plate 4. The upper end of the plate 163 has a vertical recess 164 to receive the pin 165 in the upper and lower bars 7 of the main movable frame. The lower plate like 163 is not shown, but it is similar in construction and mounting to the upper one.

When the voter leaves the voting machine or booth, as explained in my said application, and as has herein been explained, the main movable frame is thrown to the left, as appears in Figs. 6, 7 and 8 and such movement changes the plates 161 and 163 from the position shown in Fig. 6 to that shown in Fig. 7, which causes the plate 161 to move to the right from its position in Fig. 6, and such movement brings the pins 160 under the shoulder 166 of the latch 155 and lifts it out of engagement with the pin 122, all of the latches being thus disengaged. The same movement of the plate 161 engages the inner row of pins 122 extending rearward from the plate 120 of the repeater and throws said pins over to the right, as appears in Figs. 7 and 8, from the position shown in Fig. 8 to the position shown in Fig. 7, and thereby the repeater is thrown out of engagement with the locking bars from the position shown in Fig. 2 to the position shown in Fig. 1. When the voter enters the booth or takes his place in front of the voting machine, the main movable frame is thrown in the opposite direction, as explained in my said application, from the position shown in Fig. 7 to the position shown in Fig. 6, and that movement of the main movable frame changes the position of the plates 161 and 163 to the position shown in Fig. 6, that is the plate 161 is moved back to the left out of the way of the pins 122 so that if the voter desires, he can throw the repeater mechanism into actuating engagement with the locking bar of the machine.

As the repeater plate 120 is moved to its unoperated position from its position in Fig. 2 to its position in Fig. 1, as heretofore described, the pawl 141 is moved laterally from the position shown in Fig. 2 to that shown in Fig. 1, and in such lateral movement the pin 151 on the plate 146 bears upon and throws down the outer end of the pawl and elevates the inner end, as shown in Fig. 1, so that it disengages the ratchet 137 and lets it return to normal.

To prevent the repeater mechanism from being used after a voter has voted for one of the multiple candidates, I provide the mechanism shown in Figs. 4 and 5. The pins 170 extend inward from and are secured to the front plate of the machine and on these pins I mount the vertically movable plate 171 by means of the slots 172, whereby said plate is also guided and limited in its movement. I provide a plurality of oblique slots 173 through which a plurality of the pins 128 from the repeater extend by being lengthened more than the other pins 128. On the plate 171 I provide a series of fingers 174, one for each locking bar, so placed that if the locking bar has been actuated, as appears in Fig. 5, its pin 126 will move into position immediately over the finger 174. Therefore, when said locking bar has been operated, the plate 171 cannot be elevated, and if said plate cannot be elevated the repeater cannot be moved, because it is held by the pins 128. If no locking bar has been operated, the inward movement of the repeater will elevate the plate 171 from the position shown in Fig. 5 to the position shown in Fig. 4. The reverse movement of the repeater will return the plate 171 also to its normal position.

To prevent the voting of an independent ticket after the repeater has been thrown into its operative position, I provide the bar 180, as seen in Fig. 6, secured at one end to the pin 181 extending from the plate 120 through a slot 121. The bar is held at its other end from vertical movement by the screw 182 in the stationary plate 5, said screw extending through the slot 183. The bar has on its underside a notch 184. A pin is secured on the plate 91 that is always elevated when the independent voting key is operated. The position of said notch and pin are such that when the bar 180 is not moved by the repeater inward the pin 185 will enter the notch and permit the movement of the independent voting key, but when the repeater has been moved into engagement with the locking bars of the machine and the bar 180 is moved inward, the pin 185 fails to register with the notch 184 but engages the lower edge of the bar 180 so as to prevent any vertical movement of the plate 91, and consequently any movement of the independent voting key. The reverse effect is also produced, viz: that after the independent voting key has been operated the repeater cannot be operated.

The external locking means are shown in Figs. 14 and 15. The back of the machine appears in those two figures showing back plates 186, 187 and 188. The plates 187 overlap the plate 188, and the lower end of the plate 188 is centrally cut out, as appears in Fig. 15 leaving lateral edges. This is to permit access to the rock-shaft 193 for its actuation to disclose the numerals on the counters. Upon the plate 188 and flush with the plates 187 I mount the movable plate 189. This plate is to close the opening through plate 188 and is held from removal from the machine by a dove-tailed connection with the adjacent plate 187, as seen in Fig. 21. I place a lock 191 on the adjacent edges of the two plates 187, the main body of the lock being inside of the plates with the key-holes exposed. These locks have bolts 192, shown in Fig. 21, that are thrown by pocket keys. The ends of said bolts 192 when locked, that is in the position shown in Fig. 14, extend immediately above the pins 190 on the plate 189 and prevent the vertical movement of said plate 189 to give access to the rock shaft 193 that is oscillated to disclose the number of votes recorded for each candidate in the manner explained in my said application. Since the foregoing is shown in said application, nothing further will be said about it here. The invention in this machine consists in adding a third lock 194 to one side and in line with one of the other locks so that the bolt 195 of said lock 194 will be thrown to the right when the lock 192 is unoperated. When the lock 194 is unlocked, its bolt is thrown from its position shown in Fig. 14 to that shown in Fig. 15 and the lock 194 similarly changes, whereby the bolt 195 abuts against the frame 196 that is engaged with the main movable frame of the machine by connection with the bottom bar 7 and the side bar 8 thereof. Therefore, the movable frame cannot be shifted laterally to the right from the position shown in Fig. 15, and while in such locked position no part of the machine can be operated. The idea is that by placing the key for lock 194 in the hands of some outside official, such as the judge of a court, after the voting is over and the election officers have unlocked the locks 191 in order to change the machine so as to disclose the vote, the machine cannot be operated thereafter, and this result ensues merely from the unlocking of the locks controlled by the election officers. The pin 197 is also placed in the plate 189 below one of the pins 190 so that when the plate 189 is elevated, as shown in Fig. 15, and the machine is locked, as has been explained, the machine cannot be unlocked or put in condition for operation without first closing the opening through the plate 188 by lowering the plate 189.
200 is a thumb piece for elevating the plate 189. The molding 6 extends forward beyond plates 4 and 5 about a half inch. Such parts of the machine herein shown as have not been particularly referred to are fully described in my said application.

As appears in Fig. 18 the face plate of the machine has a slot 230 through which the independent ballot is inserted, but before it can be inserted the key 231 must be operated to uncover the slot, and when operated the key operates the interlocking mechanism, as explained in my said application, and the means preventing the actuation of the vote changing mechanism, as explained in this specification and shown in Fig. 12. 232 is the ballot holder and 233 is the aperture therein through which the ballot is exposed, as in the said application.

The main movable frame locks the vote changing frame against action when the voter leaves the machine or booth by means of the pin 234, shown in Figs. 6, 7, 8 and 17 in the plate 163 and which extends above the upper end of the plate 46 of the vote changing mechanism when the plate 163 is straight or in line with 161 and the main movable frame is to the left, as shown in Fig. 7. That is the position of the parts after the voter has left the booth. When the voter enters the booth the movement of the rod 15 shown in Fig. 12 throws the main movable frame from the position seen in Fig. 8 to that shown in Fig. 6, and then the vote changing frame can be operated or changed from the position shown in Fig. 6 to that shown in Fig. 8. The main movable frame is also locked at times. While there is no voter using the machine it is in the position shown in Fig. 12 and is held by the latch 236 that is pivoted by the screws 237 to the stationary plate 4. The free end rides upon the pin 238 in the rod 15 and near the middle the latch is provided with the notch 240 and at such notch rests upon a pin 241 in the bar 8 of the main movable frame. Hence while the parts are in the position shown in Fig. 12 the main movable frame cannot be operated, in fact nothing in the machine can be operated at all until the voter, as he proceeds to take the position for voting elevates the rod 15 which lifts the latch 236 and also, as has heretofore been explained, throws the main movable frame to the right, as appears in Fig. 13. The chief advantage of this construction is that it prevents the voter or any one else from entering through the exit door of the booth or, in other words, approaching the machine on the exit side, for, while the parts are in the position shown in Fig. 12, the rod 15 at the right of the machine cannot throw the movable frame at all. Nothing about the machine can be operated until the rod 15 at the entrance side of the machine, as appears in Fig. 12, has been elevated.

A latch similar to that just described, in fact a duplicate of it, is provided at the other end of the machine, as appears in dotted lines in Fig. 14, and operates in the same way to prevent anybody entering at the entrance side of the voting machine while a voter is in the booth or is in position to operate the machine. In such case the rod 15 at the entrance side of the machine cannot be elevated, whereas the rod 15 at the exit side can be elevated, and when it is elevated while the voter is leaving the machine, as has been explained, it throws the main movable frame over, thus actuating all the registers and throwing the latch shown in Fig. 12 into locking position.

What I claim as my invention and desire to secure by Letters Patent is:

1. In a voting machine, a register, a register-actuating mechanism normally not in position to engage and actuate said register, means for returning said actuating mechanism to its normal position during which movement said mechanism engages and actuates the register, and means operative by the voter before the final operation of the machine for returning said mechanism to its normal position without actuating the register.

2. In a voting machine, a register, register-actuating mechanism that is normally not in position to engage and actuate the register, means for moving the same into position to engage and actuate the register when moved, and independent means inaccessible to a person not in the voting position and operative by the voter before the final operation of the machine for returning the register-actuating mechanism to its normal position without actuating the register.

3. In a voting machine, registers, pawls for actuating the same that are normally not in position to actuate said registers when moved, individual means for moving said pawls into actuating position, and a single independent means inaccessible to a person not in the voting position and operative by the voter before the final operation of the machine for returning all of the pawls which may have been actuated to their normal position without actuating the registers.

4. In a voting machine, registers, a register-actuating mechanism for each register that is normally not in position to actuate the register when moved, individual means for moving said register-actuating mechanisms into actuating positions, means for returning said register-actuating mechanisms to their normal position during which movement they actuate the registers, and a single independent means inaccessible to a person not in the voting position and operative by the voter before the final operation of the machine for returning all of said registering mechanisms after such partial operation to their normal positions without actuating the registers.

5. In a voting machine, registers, a register-actuating mechanism for each register that is normally out of position to actuate the register when moved, individual means for moving the same into actuating positions, a single means for returning all of said register-actuating mechanisms to their normal positions during which movement they actuate the registers, and a single independent means inaccessible to a person not in the voting position and operative by the voter before the final operation of the machine for returning said register-actuating mechanisms to normal without actuating the registers.

6. In a voting machine having a register, a pawl for actuating the register, and means controlled by the voter for preventing the pawl, when moved from actuating the register.

7. In a voting machine having a register, a pawl movable into position for actuating the register, means for returning the pawl to its unoperated position, and means controlled by the voter for preventing the pawl in such movement from actuating the register.

8. In a voting machine having a register, a ratchet wheel forming a part of the register, a sliding pawl movable into position for actuating said wheel, means for returning the pawl to its unoperated position, and means for holding it out of engagement with said wheel in the return movement thereof.

9. In a voting machine having a register, a pawl movable into position for actuating the register, two means for actuating said pawl after being placed in an actuating position, and means for preventing the pawl from actuating the register when one of such pawl actuating means is operated and permitting it to actuate the register when the other pawl actuating means is operated.

10. In a voting machine having a register, a pawl movable into position for actuating the register having a shoulder on its under side, two means for actuating said pawl after it is placed in an actuating position, and a pin on one of said pawl actuating means for said shoulder of the pawl to engage when it is moved by the other pawl actuating means, whereby the pawl may be moved so as not to actuate the register.

11. In a voting machine having a register, a plate, a ratchet wheel thereof for actuating the register, a sliding pawl with one end notched and resting on said ratchet wheel and the other end with a pin extending through a slot in said plate and a shoulder on the under side of the pawl, means for moving the sliding pawl in one direction to place it in position for actuating said wheel, a laterally movable vote-changing plate that engages the pin of the pawl and returns it to its unoperated position, and another laterally movable plate which when moved also actuates the pawl and has a pin in it extending through a horizontal slot in said plate in position to be engaged by the shoulder on the pawl when the vote-changing plate is operated.

12. In a voting machine having a register, the stationary plate 22 having in it the horizontal slot 66 and the upturned slot 39, the ratchet wheel 26 on said plate forming a part of the register, the sliding pawl 30 with its notched under edge resting upon said wheel 26 and having on the lower edge the should·r 67, the pin 38 extending from said pawl through the slot 39, the vote changing bar 43 which engages the pin 38 and pushes the sliding pawl into its unoperated position, the plate 40 that engages the pin 38 when laterally moved and pushes the pawl to actuate the wheel 26, and the pin 65 secured to said plate 40 and extending through the slot 66 to engage the shoulder 67 and elevate the pawl out of engagement with the wheel 26 when the vote-changing bar is actuated.

13. In a voting machine, a ratchet wheel forming a part of the register for each of the various candidates, a sliding pawl movable into position for actuating each of said ratchet wheels, a laterally slidable vote-changing movable frame operative by the voter for returning all of said pawls to their unoperated position, and means for preventing said pawls in such return movement from actuating the ratchet wheels.

14. In a voting machine, a vote-changing means for returning parts of the machine to their unoperated position, and a spring for returning such vote-changing means to its unoperated position.

15. In a voting machine, stationary registering mechanisms, separate means movable into and out of position with reference to each of said registering mechanisms to actuate the same, and a movable frame inaccessible to a person not in the voting position by which the voter may return said register-actuating means after they have been moved to the registering position back to their unoperated position and before the final operation of the machine.

16. In a voting machine, a register, register actuating mechanism, a key for moving said register actuating mechanism into position for actuating the register, and means inaccessible to a person not in the voting position and independent of the key for returning the register actuating mechanism to its unoperated position without actuating the register.

17. In a voting machine, a ratchet wheel forming a part of the register for each of the various candidates, a pawl movable into position for actuating each of said ratchet wheels, a vote-changing movable frame operative by the voter for returning all of said pawls to their unoperated position, means for preventing said pawls in such return movement from actuating the ratchet wheels, and a spring for returning said vote-changing frame to its unoperated position.

18. In a voting machine having registers, pawls for actuating the registers, means for moving said pawls into an actuating position, a vote-changing movable frame for moving all of the pawls into their unoperated position, another movable frame for moving said pawls to actuate the registers, and means carried by said register actuating frame for preventing the pawls from actuating the registers when the vote-changing movable frame is actuated.

19. In a voting machine, a casing, interlocking mechanisms for preventing the repetition of the operation of parts of the machine, and means within the casing and independent of said interlocking mechanism that is inaccessible to a person not in the voting position and operated by the voter before he leaves the machine for returning said interlocking mechanisms to their unoperated position.

20. In a voting machine, registering mechanisms, pawls for actuating the same, interlocking mechanisms, and a single means inaccessible to a person not in the voting position and operative before the final operation of the machine for returning the pawls and interlocking mechanisms which may have been actuated to their unoperated positions.

21. In a voting machine, means for partially operating the machine, sectional interlocking bars for preventing repeated operation thereof, subsequently actuated means for completing the operation of the machine, and a single means inaccessible to a person not in the voting position and operative by the voter before the final operation of the machine for returning all the interlocking bars to their unoperated position.

22. In a voting machine having a register, a ratchet wheel forming a part of the register, a sliding pawl movable into position to actuate said wheel, an interlocking bar movable with said pawl, means for returning the pawl and interlocking bar to their unoperated position, and means for holding the pawl out of engagement with said wheel in the return movement thereof.

23. In a voting machine, interlocking mechanisms, and two means for returning all of them to their unoperated position, one of said means being inaccessible to a person not in the voting position and operative only by the voter before the final operation of the voting machine, and the other being operative as he leaves the voting machine.

24. In a voting machine having registers, a slidable pawl to actuate the registers, a slidable interlocking bar actuated by said pawl actuating means, means inaccessible to a person not in the voting position for returning the locking bar and pawl to their unoperated position, and means for preventing the pawl in its return movement from actuating the registers.

25. In a voting machine having registers, a sliding pawl for each register, means for moving said pawl, interlocking bars actuated by said pawl actuating means, a laterally movable vote-changing frame for returning all the locking bars and pawls to their unoperated position, and means for preventing the pawls in such movement from actuating the registers.

26. In a voting machine having a register, a pawl for actuating the register, and a signal on said pawl disclosed by the movement of said pawl.

27. In a voting machine, a row of oscillatory voting keys with a pin extending from each of them, a sliding plate with notches in which said pins extend, whereby the first of said voting keys operated will actuate said plate, a signal for outside parties, and means actuated by said sliding plate for disclosing the signal.

28. In a voting machine, a row of voting keys 34 having on them the pins 33, the plate 70 with the notches 71 in one edge thereof, the horizontal sliding plate 75, a bell crank connection between the two plates, the signal 76, and the back plate of the machine with an aperture through which said signal is revealed.

29. In a voting machine, movable locking bars, a plate carrying the repeater mechanism that is movable toward and away from the ends of the locking bars, a push rod extending through the side of the voting machine frame, and a bar beside and independent of the repeater plate to which said push rod is pivoted for setting over said repeater plate.

30. In a voting machine, including suitable locking bars and pins in the ends thereof, a repeater mechanism including the swinging pawls having shoulders with a nose piece above the shoulder, a series of sliding blocks, one between each pair of swinging pawls, and shoulders on said blocks so that when said blocks are moved upward they engage the shoulders on the swinging pawls, whereby no more than one swinging pawl can be operated at the same time.

31. In a voting machine, a repeater including a series of swinging pawls, a series of abutting blocks for interlocking said swinging pawls, and a spring for returning said series of interlocking blocks to their unoperated position.

32. In a voting machine having a register, means to actuate said register, a repeater mechanism, means for returning both the repeater mechanism and the register actuating mechanism to their unoperated position, and means for preventing the register actuating means from actuating the register in such movement.

33. In a voting machine, a repeater mechanism, means for controlling the number of candidates that can be voted for by the use of the repeater mechanism, a spring tending to return said means to its unoperated position, a pawl for holding said means in its operated position, and means controlled by the voter for releasing said pawl, whereby the repeater mechanism will return to its unoperated position.

34. In a voting machine, a repeater mechanism, the ratchet wheel 137 that is connected with the repeater controlling mechanism, the spring 140 for returning said ratchet wheel to its unoperated position, the pawl 141 for holding said wheel in its operated position, the sliding plate 146 provided with the pin 151 actuates said pawl 141 to cause it to disengage the ratchet wheel, the pins 145 and 150 in said plate 146, the rotary shaft 51 controlled by the voter, and the arm 144 extending from said shaft between the pins 145 and 150, whereby said arm 144, will while in this position, hold the plate 146 in its elevated position, and when moved will depress said plate 146.

35. In a voting machine, means for voting for a group of candidates, a repeater mechanism movable into and out of connection with said voting means for limiting the number of candidates that can be voted for,
an independent voting mechanism, and means actuated by the movement of the repeater mechanism and the operation of the independent voting mechanism for locking each other against use.

36. In a voting machine, an independent voting mechanism, a series of sliding plates which prevent the operation of the independent voting mechanism when they cannot be moved, a repeater mechanism, and a sliding bar that is connected with said repeater mechanism for stopping said sliding plates from movement when the repeater mechanism is moved into position for use.

37. In a voting machine, a repeater mechanism, a sliding bar movable by the repeater mechanism when it is thrown into use that has a notch in it, an independent voting mechanism, a sliding plate movable at a right angle to said sliding bar, a pin in said sliding plate that registers with the notch in the sliding bar when the latter is not operated and which engages said sliding bar when it is operated, and means connecting said sliding plate and the independent voting mechanism, whereby the independent voting mechanism actuates said sliding plate and is prevented from actuation when said sliding plate cannot be moved.

38. In a voting machine, an independent voting mechanism, a register actuating mechanism for voting for candidates on a regular ticket, a key for actuating such register actuating mechanism, means for returning the register actuating mechanism to its unoperated position, and means actuated by the independent voting mechanism for preventing the actuation of the means for returning the register actuating mechanism to its original position.

39. In a voting machine, an independent voting mechanism, a sliding plate actuated by said independent voting mechanism, a pin in said plate, and a vote-changing mechanism including a plate moving at a right angle to the other movable plate and having a notch in it into which the pin of said other movable plate enters when the independent voting mechanism is operated.

40. In a voting machine, an independent voting mechanism, a horizontally sliding plate 88 which is moved by said independent voting mechanism, a vertically movable plate, means whereby the horizontal plate will move the vertical plate, the pin 103 through said plate 88, a horizontal plate 44 movable across the plate 88 when the latter is not elevated, and a vote-changing mechanism with which the plate 42 is connected.

41. In a voting machine, internal means for preventing the operation of the parts thereof, an externally operated lock for holding said internal locking means in a locked position, means for disclosing the vote, and a second externally operated lock for releasing said vote disclosing means which throws the bolt of the first named lock and thereby locks it.

42. In a voting machine, a movable frame which in one position holds all parts of the machine from operation, a lock externally accessible so located that its bolt when thrown engages said movable frame and holds said frame in its locking position, means for disclosing the vote, a sliding plate in the casing through which the vote disclosing mechanism is accessible, and a lock externally accessible, the bolt of which when moved in one direction holds said plate closed to render the vote-disclosing mechanism accessible and when thrown in the other direction engages and throws the bolt on the first named lock into locking engagement with the movable frame, whereby the entire machine is locked against operation when the machine is opened to actuate the vote-disclosing mechanism.

43. In a voting machine, a vote-disclosing means, a movable plate in the casing for rendering the vote-disclosing mechanism inaccessible except when said plate is locked mounted adjacent said sliding plate, two pins in said sliding plate, one of said pins being under the bolt of the lock when the sliding plate is closed and the bolt is thrown, and the other pin in position to prevent the throwing of the bolt of the lock when the sliding plate is opened.

44. In a voting machine, a vote disclosing mechanism, a sliding plate in the casing that renders said vote-disclosing mechanism accessible, an internal locking mechanism that locks all parts against actuation, an externally accessible lock for locking said internal locking mechanism in a locking position, a second externally accessible lock between said sliding plate and the first named lock and the bolt of which when moved in one direction throws the bolt of the first named lock in position to hold said internal locking mechanism in a locking position, a pin on said sliding plate which is engaged by the bolt of the lock adjacent to said plate when said bolt is thrown inward and said sliding plate is closed, and means on said sliding plate for preventing the inward throwing of the lock adjacent to said plate when said plate is open.

45. In a voting machine, internal locking means for holding the parts of the machine from actuation, a pin thereof, a notched latch pivoted to a stationary part of the machine for holding said pin from movement, and a vertically movable rod actuated before voting which releases said latch and actuates said internal locking means.

46. In a voting machine a casing having registers, pawls for actuating the registers, means for moving said pawls into an actuating position, locking mechanism within the casing for holding the parts from actuation, means operative by the voter before voting for moving said locking means to an unlocking position, and means within the casing for holding it in the latter position while the voter is using the machine.

47. In a voting machine a casing having registers, pawls for actuating the registers, means for moving said pawls into an actuating position, a locking means for holding all parts of the machine from actuation, means actuated by the voter as he leaves the voting machine for moving said locking means into locking position, means for holding said locking means after it has been actuated, and means operative by the voter before voting for releasing said locking means and moving it into an unlocking position.

48. In a voting machine, a stationary registering mechanism, a pawl for actuating the same that is movable into and out of actuating position, indicating mechanism for placing the pawl in actuating position with reference to the registering mechanism, and a movable part for causing the return of the pawl to normal position without actuating the register.

49. In a voting machine, stationary registering mechanisms, a pawl for actuating each registering mechanism that is movable into and out of actuating position, indicating mechanism for placing each pawl in actuating position with reference to its corresponding registering mechanism, and a movable part for causing the return of all of the pawls simultaneously to normal position without actuating the registers.

In witness whereof, I have hereunto affixed my signature in the presence of the witnesses herein named.

EDWIN B. CUMMINGS.

Witnesses:
V. H. LOCKWOOD,
FLORENCE E. BRYANT.